(12) United States Patent
Krueger et al.

(10) Patent No.: US 6,874,139 B2
(45) Date of Patent: Mar. 29, 2005

(54) METHOD AND SYSTEM FOR SEAMLESS INTEGRATION OF PREPROCESSING AND POSTPROCESSING FUNCTIONS WITH AN EXISTING APPLICATION PROGRAM

(75) Inventors: Scott Krueger, Palm Springs, CA (US); Daniel Goodman, Miami Beach, FL (US)

(73) Assignee: Interfuse Technology Corporation, Boca Raton, FL (US)

( * ) Notice: Subject to any disclaimer, the term of this patent is extended or adjusted under 35 U.S.C. 154(b) by 440 days.

(21) Appl. No.: 09/855,425

(22) Filed: May 15, 2001

(65) Prior Publication Data

US 2002/0033838 A1 Mar. 21, 2002

Related U.S. Application Data (60) Provisional application No. 60/204,261, filed on May 15, 2000.

(51) Int. Cl.[7] .................................................. G06F 9/44
(52) U.S. Cl. ........................ 717/127; 717/131; 719/329; 719/331; 713/165
(58) Field of Search ................................. 717/127, 131; 719/313, 328, 329, 331; 713/165; 707/205, 206

(56) References Cited

U.S. PATENT DOCUMENTS

| | | | | |
|---|---|---|---|---|
| 5,551,037 A | * | 8/1996 | Fowler et al. | 709/313 |
| 5,699,428 A | * | 12/1997 | McDonnal et al. | 713/165 |
| 5,757,908 A | * | 5/1998 | Cooper et al. | 713/165 |
| 5,872,976 A | * | 2/1999 | Yee et al. | 717/127 |
| 5,884,246 A | * | 3/1999 | Boucher et al. | 704/2 |
| 5,956,481 A | * | 9/1999 | Walsh et al. | 713/200 |
| 5,991,778 A | * | 11/1999 | Starek et al. | 707/205 |
| 6,026,235 A | * | 2/2000 | Shaughnessy | 717/127 |
| 6,115,039 A | * | 9/2000 | Karren et al. | 345/746 |
| 6,141,698 A | * | 10/2000 | Krishnan et al. | 709/331 |
| 6,185,681 B1 | * | 2/2001 | Zizzi | 713/165 |
| 6,230,310 B1 | * | 5/2001 | Arrouye et al. | 717/136 |
| 6,263,488 B1 | * | 7/2001 | Fortin et al. | 717/127 |
| 6,351,813 B1 | * | 2/2002 | Mooney et al. | 713/185 |
| 6,604,150 B1 | * | 8/2003 | Gebhart et al. | 709/328 |
| 6,611,878 B2 | * | 8/2003 | De Armas et al. | 709/328 |
| 6,615,224 B1 | * | 9/2003 | Davis | 707/202 |
| 6,629,109 B1 | * | 9/2003 | Koshisaka | 707/203 |
| 6,637,023 B1 | * | 10/2003 | Ginsberg | 717/131 |
| 6,675,371 B1 | * | 1/2004 | York et al. | 717/114 |

* cited by examiner

*Primary Examiner*—Tuan Dam
*Assistant Examiner*—Michael Yigdall
(74) *Attorney, Agent, or Firm*—Greenberg Traurig, LLP; Paul F. McQuade; James E. Goepel (57) ABSTRACT

A method for associating file activity of an application with the graphical display of the file on a screen comprises loading by an operating system an executable code of a message monitoring program adapted to monitoring a message sent by an operating system to a document display window. The message monitoring program establishes a system-wide window hook using available operating system API functions associated with one or more functions in a library of the message monitoring program. The message monitoring program library is loaded into the memory space of a newly started application program, the import table of the application is fixed with addresses of functions from the message monitoring program library, and the application's main window function is substituted with a message monitoring program window function.

33 Claims, 5 Drawing Sheets

Figure 1

```
Application Address Space (Notepad.exe)
201 → Kernel32.dll
     80000000   4D 5A 90 00 03 00 00 00 04 00 00 00 FF FF 00 00   MZ..........ÿÿ..
     80000010   B8 00 00 00 00 00 00 00 40 00 00 00 00 00 00 00   ........@.......
     80000020   00 00 00 00 00 00 00 00 00 00 00 00 0C 00 00 00   ................
     ...
     800000C0   00 00 00 00 00 00 00 00 50 45 00 00 4C 01 04 00   ........PE..L...
     800000D0   32 2C 30 3F 00 00 00 00 00 00 00 00 E0 00 0E 23   2,0?........à..#
     800000E0   0B 01 05 0C 00 8C 05 00 00 78 05 00 00 00 00 00   .....Œ...x......

┌──────────────────────────────────────────────┐
     │ Code for CreateFileA                         │
     │ 80000A32  push  ebp                          │
202 →│ 80000A33  mov         ebp,esp                │
     │ 80000A35  push  dword ptr [ebp+8]            │
     │ 80000A38  call        800092C5               │
     │ 80000A3D  test  eax,eax                      │
     │ 80000A3F  jne         80009123               │
     │ 80000A41  or          eax,0FFFFFFFFh         │
     │ 80000A44  jmp         8000913D               │
     │ 80000A46  push  dword ptr [ebp+20h]          │
     │ 80000A49  push  dword ptr [ebp+1Ch]          │
     │ 80000A4C  push  dword ptr [ebp+18h]          │
     │ 80000A4F  push  dword ptr [ebp+14h]          │
     │ 80000A52  push  dword ptr [ebp+10h]          │
     │ 80000A55  push  dword ptr [ebp+0Ch]          │
     │ 80000A58  push  dword ptr [eax+4]            │
     │ ...                                          │
     └──────────────────────────────────────────────┘

Application Instance Handle and Code (Import Table)
00400000   4D 5A 90 00 03 00 00 00 04 00 00 00 FF FF 00 00   MZ..........ÿÿ..
00400010   B8 00 00 00 00 00 00 00 40 00 00 00 00 00 00 00   ........@.......
00400020   00 00 00 00 00 00 00 00 00 00 00 00 00 00 00 00   ................
...
004000D0   50 45 00 00 4C 01 05 00 0C 22 CC 3F 00 00 00 00   PE..L...."Ì?....
004000E0   00 00 00 00 E0 00 0E 01 0B 01 06 00 00 10 02 00   ....à...........
004000F0   00 A0 00 00 00 00 00 00 F0 10 00 00 00 10 00 00   . ......ð.......
203 → ...
0042A150   32 0A 80 80  78 09 59 7C BC 69 59 7C 9D 6C 59 7C   .ÄX|x Y|¼iY|.lY|
0042A160   7B 0B 59 7C 1C 68 59 7C D6 F5 57 7C 77 87 57 7C   {.Y|.hY|Öõw|w‡W|
0042A170   9C 62 58 7C 94 B5 57 7C C4 F7 57 7C 09 0B 59 7C   œbX|"µW|Ä÷W| .Y|

0042A1B0   4D 7E 57 7C 25 6E 59 7C AC 0B 59 7C C4 F4 58 7C   M~W|%nY|¬.Y|ÄôX|
0042A1C0   62 F4 58 7C D3 , C7 FC 77 1B E7 58 7C 4A EA F8 77   bôX|Óçüw.çX|JêøW
0042A1D0   45 82 57 7C BA DD 5A 7C B1 7C 59 7C 0F 7C 59 7C   E‚W|ºÝZ|±|Y|.|Y|
...
0042A26C   00 00 00 00 2E 00 43 6C 6F 73 65 48 61 6E 64 6C   ......CloseHandl
0042A27C   65 00 4D 00 43 72 65 61 74 65 46 69 6C 65 41 00   e.M.    CreateFileA
0042A28C   4B 45 52 4E 45 4C 33 32 2E 64 6C 6C 00 00 77 01   KERNEL32.dll  ..w.
...
                               204 →
     ┌──────────────────────────────────────────────┐
     │                                              │
     └──────────────────────────────────────────────┘

Executable Code - Create File Call
     85:  HANDLE hFile=CreateFile("c:\\test.txt",GENERIC_WRITE|GENERIC_READ, 0,
205 →                               NULL,CREATE_ALWAYS,0,NULL);
     0040D6F8   mov     esi,esp
     0040D6FA   push    0
     0040D6FC   push    0
     0040D6FE   push    2
     0040D700   push    0
     0040D702   push    0
     0040D704   push    0C0000000h
     0040D709   push    offset string "c:\\test.txt" (00422fe8)
     0040D70E   call    dword ptr [__imp__CreateFileA@28 (0042a150)]
```

Figure 2a

210 → Application Address Space - Notepad.exe
211 → Kernel32.dll
```
80000000  4D 5A 90 00 03 00 00 00 04 00 00 00 FF FF 00 00   MZ..........ÿÿ..
80000010  B8 00 00 00 00 00 00 00 40 00 00 00 00 00 00 00   ........@.......
80000020  00 00 00 00 00 00 00 00 00 00 00 00 00 00 00 00   ................
...
800000C0  00 00 00 00 00 00 00 00 50 45 00 00 4C 01 04 00   ........PE..L...
800000D0  32 2C 30 3F 00 00 00 00 00 00 00 00 E0 00 0E 23   2,0?........à..#
800000E0  0B 01 05 0C 00 8C 05 00 00 78 05 00 00 00 00 00   .....Œ...x......
...
```

212 →
```
Code for CreateFileA
80000A32  push    ebp
80000A33  mov     ebp,esp
80000A35  push    dword ptr [ebp+8]
80000A38  call    800092C5
...
```

```
Impersonation DLL
20000000  4D 5A 90 00 03 00 00 00 04 00 00 00 FF FF 00 00   MZ..........ÿÿ..
20000010  B8 00 00 00 00 00 00 00 40 00 00 00 00 00 00 00   ........@.......
217 → 20000020  00 00 00 00 00 00 00 00 00 00 00 00 00 00 00 00   ................
```

216 →
```
206: HANDLE WINAPI MyCreateFile(LPCSTR lpFileName, DWORD dwDesiredAccess,
207:         DWORD dwShareMode, LPSECURITY_ATTRIBUTES lpSecurityAttributes,
208:         DWORD dwCreationDisposition, DWORD dwFlagsAndAttributes,
209:         HANDLE hTemplateFile){
200000D8  push    ebp
200000D9  mov     ebp,esp
200000DA  sub     esp,88h
200000D9  push    ebx
200000E1  push    esi
200000E4  push    edi
200000E5  lea     edi,[ebp-88h]
200000EA  mov     ecx,22h
200000F2  mov     eax,0CCCCCCCCh
200000F8  rep stos dword ptr [edi]
```

```
Application Instance Handle and Code (Import Table)
00400000  4D 5A 90 00 03 00 00 00 04 00 00 00 FF FF 00 00   MZ..........ÿÿ..
00400010  B8 00 00 00 00 00 00 00 40 00 00 00 00 00 00 00   ........@.......
00400020  00 00 00 00 00 00 00 00 00 00 00 00 00 00 00 00   ................
...
004000D0  50 45 00 00 4C 01 05 00 0C 22 CC 3F 00 00 00 00   PE..L...."Ì?....
004000E0  00 00 00 00 E0 00 0E 01 0B 01 06 00 00 10 02 00   ....à...........
004000F0  00 A0 00 00 00 00 00 00 F0 10 00 00 10 00 00      . ......ð.......
...
0042A150  32 0A 80 80 78 09 59 7C BC 69 59 7C 9D 6C 59 7C   .Áx Y|¼iY|.lY|
0042A160  7B 0B 59 7C 1C 68 59 7C D6 F5 57 7C 77 87 57 7C   {.Y|.hY|ÖõW|w‡W|
0042A170  9C 62 58 7C 94 B5 57 7C C4 F7 57 7C 09 0B 59 7C   œbX|"µW|Ä÷W| .Y|
...
0042A1B0  4D 7E 57 7C 25 6E 59 7C AC 0B 59 7C C4 F4 58 7C   M~W|%nY|¬.Y|ÄôX|
0042A1C0  62 F4 58 7C D3 C7 FC 77 1B E7 58 7C 4A EA F8 77   bôX|ÓÇüw.çX|Jêøw
213 → 0042A1D0  45 82 57 7C BA DD 5A 7C B1 7C 59 7C 0F 7C 59 7C   E,W|ºÝZ|±|Y|.|Y|
...
0042A26C  00 00 00 00 2E 00 43 6C 6F 73 65 48 61 6E 64 6C   ......CloseHandl
0042A27C  65 00 4D 00 43 72 65 61 74 65 46 69 6C 65 41 00   e.M.CreateFileA.
0042A28C  4B 45 52 4E 45 4C 33 32 2E 64 6C 6C 00 00 77 01   KERNEL32.dll..w.
...
```

214 →

```
Executable Code - Create File Call

85: HANDLE hFile=CreateFile("c:\\test.txt",GENERIC_WRITE|GENERIC_READ, 0,
                            NULL,CREATE_ALWAYS,0,NULL);
0040D6F8  mov     esi,esp
215 → 0040D6FA  push    0
0040D6FC  push    0
0040D6FE  push    2
0040D700  push    0
0040D702  push    0
0040D704  push    0C0000000h
0040D709  push    offset string "c:\\test.txt" (00422fe8)
0040D70E  call    dword ptr [__imp__CreateFileA@28 (0042a150)]
...
```

METHOD AND SYSTEM FOR SEAMLESS INTEGRATION OF PREPROCESSING AND POSTPROCESSING FUNCTIONS WITH AN EXISTING APPLICATION PROGRAM

CROSS REFERENCE TO RELATED UNITED STATES APPLICATIONS

This application claims priority from "METHOD AND SYSTEM FOR SEAMLESS INTEGRATION OF PREPROCESSING AND POSTPROCESSING FUNCTIONS WITH AN EXISTING APPLICATION PROGRAM", U.S. Provisional Patent Application No. 60/204,261, filed May 15, 2000 by Goodman, et al., the contents of which are incorporated herein by reference.

BACKGROUND OF THE INVENTION

The present invention relates to a method and system for performing a preprocessing function on a file after it is opened and before it is operated on by an existing program, and to a method and system for performing a postprocessing function on a file after it is closed by the existing program.

Application programs such as the Microsoft Word word processing program, the Microsoft Excel spreadsheet program, and the Microsoft PowerPoint presentation program, all are designed to open a file (or create a new one), perform certain functions on the file, and then close the file when the user has finished his tasks. These application programs all share many common traits and functionality, and in fact are designed to be part of a suite of tools, which is referred to as Microsoft Office (other vendors feature similar suites with different names, but the same intended functionality). In the case of Word, the program typically opens a file from storage, edits the file for example by adding text, optionally prints the file, and then saves and closes the file. Since these application programs are obtained in a compiled version, it is not possible for users to be able to modify the functionality of the application, and the user can only perform the functions provided by the vendor.

It is desired to be able to give a user an opportunity to perform certain "value-added" operations on a file that are not specifically related to the application program. For example, it is often desired to encrypt a data file for security purposes. Encryption techniques are of course well known, and several discrete application programs exist that allow the user to execute encryption and decryption steps on a data file. That is, the user would have to run the encryption program on the file on disk, and then run the decryption program prior to running the word processing application so that the word processing program may operate on the file "in the clear". The user would again have to run the encryption program on the file in order to ensure its security.

Likewise, other preprocessing and postprocessing operations may need to be performed on a file, such as compression, language translation, file backup, anti-virus analysis, and debugging. While certain programs exist for some of these applications, they all suffer from the same problem of having to be separately executed by a user. Since a user may forget to do these operations, this paradigm is undesirable.

Thus, the inventors have recognized the need for being able to seamlessly integrate one or several preprocessing and postprocessing functions into an existing application so that they are automatically performed on a file without requiring a user to affirmatively execute a separate program. In particular, it is desired to be able to add this seamless functionality to existing programs such as the Microsoft Office programs, which have a large installed user base. Since the user will have the Office application program only in a complied version, there exist no solution today that solves the problems described above.

SUMMARY OF THE INVENTION

Disclosed herein is a method and program for adding functionality to an existing, compiled application program such as Microsoft Word, or a compiled, dynamically linked library, so that preprocessing and postprocessing functions can be performed on the files without requiring any user intervention. This program for adding functionality to an existing executable program in effect impersonates the application by replacing calls to operating system interface functions with calls to functions that are part of the system of the invention. This enables the system of the invention to intercept messages from the operating system to the application program, or from one function of the application to another function of the application. It is this ability to impersonate or masquerade as the application that enables the program of the invention to seamlessly add functionality to the application. The program and method of the invention will be referred to herein as the impersonation method and system.

It is an element of the impersonation method of the invention that all file activity happening through API calls is related to windows representing graphic displays of that or related files in these different interfaces.

In another aspect of the invention, provided is a method for intercepting software calls to subroutines and functions contained in program executables and dynamically linked libraries ("DLLs").

In a graphical operating system such as Microsoft Windows, the relationship between file activity on a storage medium such as a hard disk, and the display of the file on screen is completely arbitrary and defined by the application. There is currently no operating system provided method for an external application to determine this relationship. It is a method of the invention that such a relationship can be created. The purpose of the invention is to provide third-party programs with the opportunity to act on files before they are opened and displayed by the primary application, and to take action on files when the application is finished.

As an exemplary application of the preprocessing and postprocessing functionality of the present invention, also disclosed herein is an invention that can be used, in a preferred embodiment, to encrypt and decrypt files used in any of the Microsoft Office applications (Word, PowerPoint, Excel, etc.). This file encryption/decryption process of the invention is referred to herein as file locking, and the system for carrying out this process is referred to as the file locking system. File locking provides application-based, rather than file-based security. It will be immediately apparent to the skilled artisan, however, that program impersonation system and method presented herein has many other applications besides file locking.

The file locking system is a data security application that integrates seamlessly with the entire family of Microsoft Office applications. The file locking system is designed to provide fully automatic protection. Once installed, it is impossible to identify where Office ends and the file locking system begins. It becomes part of Microsoft Office, automatically decrypting files when they're opened and encrypting them again when they're closed. Users never need to remember to follow security procedures—the file locking system remembers for them.

The file locking system encrypts and decrypts files seamlessly and automatically. A user logs on to the file locking system when they start Windows. Subsequently, when any file within any protected application is closed, the file locking system encrypts it automatically. When an encrypted file is opened by an authenticated user, it is automatically decrypted. It doesn't matter whether the file is a Microsoft Word document, an Excel spreadsheet, or what folder the file is saved in. The file locking system knows when files are being opened or closed because it scans the memory space of protected applications and monitors all traffic.

The file locking system uses a secret key to encrypt and decrypt files. Every installation of the file locking system generates its own secret key at installation time. This key uses random data and is unique to the computer on which the file locking system is installed. The secret key is encrypted on the protected PC. When a user logs on, the file locking system decrypts the key, holds it in protected memory, and uses the decrypted key to encrypt data. If an attacker manages to copy the key and some encrypted files to his own computer, the encrypted files cannot be decrypted on another PC because the attacker does not know the logon password to decrypt the key.

The file locking system is different from other encryption products (PGP and Your Eyes Only, for example) in that these other products require that users save files to a specific protected location. In other words, in order for a file to be secure, it must be saved in a folder that has been designated as protected. The problem with this is that many users don't know or care where their files are; they save files "in Word", or "in Excel". It is unrealistic to demand that all users understand the file system. The file locking system avoids this problem by providing fully automatic encryption and decryption of Windows documents through seamless integration with protected applications. Once the file locking system is installed and a protected application is running, it is impossible to tell where the Windows application ends and the file locking system begins. Instead of protecting locations on disk, the file locking system protects everything that a protected application creates, wherever it creates it and wherever a user chooses to send it. Users can utilize their Windows applications the way they always do. There is nothing new to learn or to remember.

Encryption Overview

The "Open Source Code" encryption engine used by the file locking system is highly regarded by leading cryptographers. Its source code has long been publicly available on the Internet for peer review by the cryptographic community. Use of open source code unambiguously demonstrates that the file locking system's encryption methods can withstand close scrutiny.

"Closed Source Code" is the path that most publishers of security software follow; they do not make the source code, and therefore the soundness, of their encryption engines readily available for public review and critique.

File Headers

Every Office file has a file header, which includes information about the file including the file type, location, size, the dates the file was created, last modified, last accessed, etc. The ability to search header information for files with particular properties can be a mission-critical data management tool. Other encryption programs encrypt the entire file, including header data, effectively disabling this powerful search tool. Because the file locking system is seamlessly integrated into Microsoft Office, it can encrypt file data without encrypting file headers. Users can retain the ability to search file header data without compromising file security.

Other programs encrypt the entire file so that if an unauthorized individual opens it, they see a garbled stream of data. Either by accident or maliciously, someone could insert a character into the encrypted file and corrupt it so that it could not be decrypted. Instead of displaying the encrypted file, the file locking system displays meaningful alternative information. The information is write-protected so that there is no way for an accidental recipient or viewer to modify and corrupt the file. A viewer who accidentally opens a file locked, encrypted, document knows that they have opened a file that they are not authorized to view.

Shredding

File shredding is necessary to ensure data security. After an unwanted file is deleted "normally", both the file and its data can still be easily recovered if an attacker has the right tools. File shredding removes this risk by thoroughly wiping the data from the hard disk at the sector level.

The file locking system file shredding conforms to the rigorous data security standards set forth in the U.S. National Industrial Security Program Operating Manual (NISPOM; DoD 5220.22-M). The Manual prescribes requirements, restrictions, and other safeguards that are necessary to prevent unauthorized disclosure of classified information. These guidelines were formulated pursuant to Executive Order 12829, and with the concurrence of the Secretary of Energy, the Chairman of the Nuclear Regulatory Commission, and the Director of Central Intelligence.

Shredding plays an important role in the file locking system operation. To the file locking system user, encryption is a transparent, automatic process; a user closes a file and it is automatically encrypted. However, the actual procedure is more complex. When a file is closed within a protected application, the file locking system creates an unencrypted copy of the file and stores it in a recovery folder. This ensures that if a power failure or other disruption occurs during encryption, the file can be retrieved. Then the file locking system makes an encrypted copy. Once the encrypted copy is successfully created, both the original file and the clear copy in the recovery folder are shredded and deleted so that they cannot be recovered. Similar risk management procedures are in place for decryption, ensuring that a file can be recovered if something goes wrong during the decryption process. Should a problem occur during encryption or decryption, the next time the user logs on to the file locking system he or she is prompted to recover the file. The file locking system can automatically shred both data files and temporary files.

BRIEF DESCRIPTION OF THE DRAWINGS

FIG. 2a is a block diagram of the memory space of an application program executable.

FIG. 2b is a block diagram of the memory space of an application program executable with an impersonation program DLL.

DETAILED DESCRIPTION OF THE INVENTION

The Windows operating system uses two primary types of window interfaces to represent documents to the user on screen, and two hybrid interfaces that contain elements of both. The first is called Single Document Interface (SDI), and is used to display a single application window for each instance of the program that is run, containing only one file. Additional files that are opened are represented by an additional application instance and window created for the additional files. Another method of display is referred to as a Multiple Document Interface (MDI). With MDI, a single application window is created, and an MDI parent window is created that is a child of the application window. All document representations are created as children of the parent MDI window. Starting with the application Office 2000, Microsoft has adopted two additional hybrid interfaces that contain elements of both of these primary types. The first is an MDI interface that associates hidden application windows with each of the documents in the MDI. This allows the user to perceive each document as if it where an SDI, with the associated features of an application window such as buttons on the task bar, and the listing of the document in the Task List. This is a description of the hybrid used by programs such as Microsoft Excel 2000. Microsoft Word 2000 uses a second hybrid MDI interface. It continues to display each document in an MDI format with the document represented as a child of the MDI parent; however, each subsequent document is displayed in a additional application windows containing a parent MDI and child document window.

Additionally, many applications make use of multiple thread technology, where actions are taken on files in a background thread that relate to the document displayed; however, these background threads contain no direct connection to the window representing the document. For example, the AutoSave feature of Microsoft Office applications will respond to timer input and automatically save a copy of open files in a background thread. These AutoSave files do not have a direct relationship to the windows displayed, and in fact are prohibited by the nature of multiple threads from sending messages to windows not created by that thread; however, the user perceives these actions as happening to windows displayed on the screen.

An executable program compiled for the Win32 (Windows' 32-bit) environment contains a feature known as an import table. The import table is integral to the format of executable programs that can run on many platforms. The import table contains the name of dynamically linked libraries ("DLLs") and the name or ordinal number of functions and subroutines in those DLLs that are used by the executable. These functions are collectively referred to as the Application Program Interfaces ("APIs"). The import table also contains placeholder's for the addresses of these functions in the address space allocated by the operating system when these DLLs are loaded. A DLL can also have an import table and import functions from other DLLs referenced therein.

Figure 1:
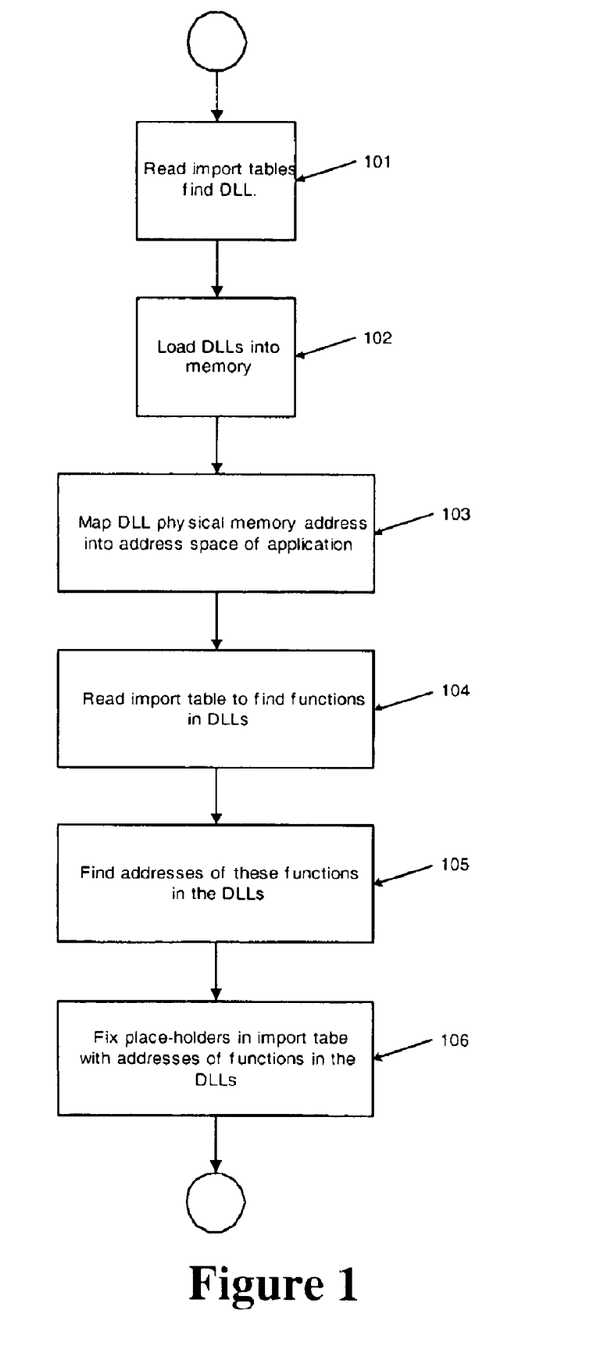
FIG. 1 is a flow chart of the steps involved in loading an application and linking to a dynamically linked library.

Referring now to FIG. 1, when loading an executable application program, the Windows program loader takes the following actions. First, at step 101, the loader reads the import table to find the DLLs needed by the executable. Next, at step 102, the referenced DLLs are loaded into memory. Then, at step 103, the loader maps the physical memory address of these DLLs in memory into the address space of the application. The loader then at step 104 reads in the import table the names of the subroutines or functions in the DLLs referenced by the executable, and finds at step 105 the addresses of these subroutines and functions in the loaded DLLs. Finally, at step 106, the loader writes the addresses of these subroutines and functions into the placeholders in the import table as they are loaded into the address space allocated for the executable application. The step of writing function addresses into the placeholder of the import table is referred to in the art as "fixing-up" the import table.

It is a feature of many current programs to provide higher level API calls that encapsulate many lower-level functions. For example, Microsoft's Object Linking and Embedding (OLE) format, now also known as Component Object format (COM), might use one function imported from a DLL such as StgOpenStorage, and return a memory pointer to a structure known as a Virtual Import Table ("Vtbl"). This table, which is an array of pointers to functions, serves the same purpose as the import table in a executable or DLL. The impersonation process described herein can call the high-level API function, inspect the return value, and insert substitute function references into the Vtbl. This enables the impersonation process to intercept executable calls to these high level functions. The impersonation system function can then optionally call the replaced function.

Hooking the APIs

Hooks are locations in executable code which can be changed to a call to an outside function or subroutine. The impersonation process of the invention can not only hook the lowest level file operations, but also any higher level API's that reference these functions—especially those in related DLLs. For example, the impersonation process can not only hook the "CreateFile" API from the Windows kernel DLL directly, but can also find the import table of the OLE32.dll, and hook the kernel functions the OLE32.DLL import table. It is an additional element that before an application can open a file, the impersonation system opens the file itself and increments a file reference count by one. The impersonation system maintains an internal memory table to store the reference count of open operations performed on the file not only by the application, but by any additional DLLs referenced by the application. The impersonation system also keeps track of the close operations performed by the application and associated DLLs referenced by the application. These close operations are matched up to the reference count in the internal memory structure. When the reference count reaches 1, all associated file operations in the program have released their references to the file, and impersonation system can then release access to the file.

In addition, this hooking of API functions is directly associated with the document presentation visible on the screen.

The preferred embodiment of the impersonation process obtains a handle/memory address of an application executable from the operating system. In the Win32 environment, the handle is also a mapped memory address of the executable code. Using the published specifications of the executable format and the structures contained therein, the impersonation system can locate the list of the DLLs, functions and subroutines, and "fixed-up" address locations of the placeholders for those functions. The impersonation process saves the original address information in an internal memory structure for future reference, and then substitutes the address of functions or subroutines in the import table with its own functions.

For example, the Windows standard accessory Notepad.exe, could contain references to the CreateFile function in Kernel32.dll. The Windows program loader can fix-up the placeholder with the address of CreateFile, e.g., 0x80000A32. This is depicted in FIG. 2a. The impersonation process can find this information, and load its own DLL containing a substitute function, such as "myCreateFile", as shown in FIG. 2b. For example, the impersonation system DLL can be loaded at address 0x20000000, and the function myCreateFile can start at address 0x200000D8. The impersonation process then substitutes this address, 0x200000D8, in the placeholder of the import table for the address of CreateFile, 0x80000A32. When the Notepad executable's code calls the CreateFile function it expected to be provided by Kernel32, it instead finds the address of the substitute function, 0x200000D8, and execution of code is passed to "myCreateFile". Optionally, the substitute function could look up the address of the original function or subroutine and call that code.

Dynamic Link Libraries (DLLs) can also have an import table and import the functions from other DLLs. It is an element of the impersonation process that it can also hook the import table of associated DLLs. By searching for a specific DLL of interest or reading the import table of the main executable program, it can get the module handle/memory location of associated DLLs. The impersonation process can then hook the import table of these DLLs in the same manner.

Window to File Relationships

The impersonation process establishes a relationship between the file activity of an application and the windows graphically displaying a representation of the file (and related referenced files) on screen. This is done by using the messaging features inherent in Windows for manipulating graphical windows, and creating the impersonation process's own window procedures to track the relationship between file activity and screen display.

This relationship is tracked by several methods.

Figure 3:
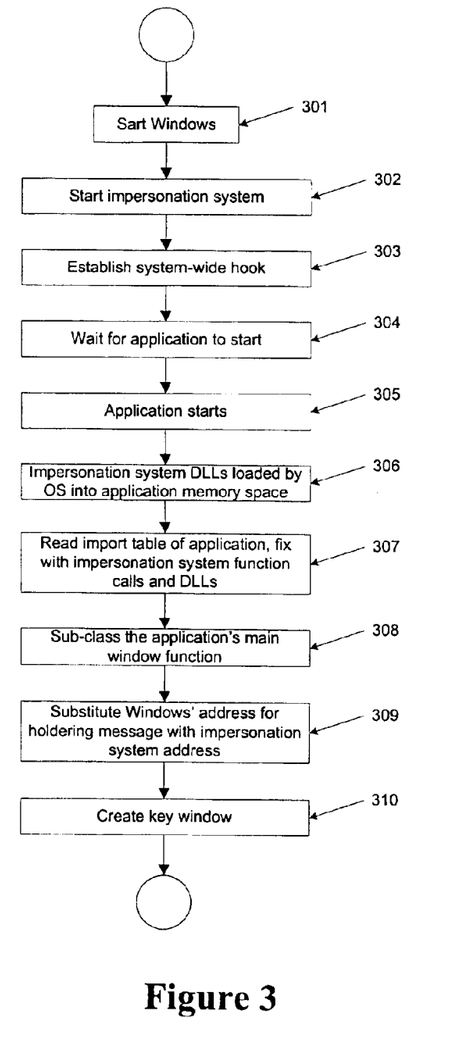
FIG. 3 depicts a flow chart of how the impersonation system starts processing and the actions it performs when an application starts.

Referring now to FIG. 3, a primary impersonation system executable program is run at step 302 by Windows on start up at step 301. This primary executable establishes at step 303 a system-wide window hook using a standard operating system API, SetWindowsHookEx. The hook is associated by the API with code contained in a first impersonation system DLL. This tells Windows that the impersonation system wants notification of all windows that are opened or closed. Windows is provided with the address of the first impersonation system DLL and the function to call.

When an application is started at step 305 and a new application window is created, the operating system loads at step 306 the code of the first impersonation system DLL into the memory space of the application, fixes the import table of the application, and sends a message to the hook function that an application window has been created. At this point, the first DLL dynamically loads a second impersonation system DLL that contains code to determine if this is an application that the impersonation system is interested in (such as a document handler or Microsoft Office application). If the application is of interest, the import table of the application is read and fixed-up with addresses of the impersonation system functions and DLLs at step 307. These other impersonation system DLLs are loaded into the memory space of the application. The impersonation system also substitutes the application's main window function with an impersonation system function at step 308. This function substitution is referred to as sub-classing. Application window sub-classing allows the impersonation system to monitor the creation of document and MDI parent windows. If a MDI parent window is created, the impersonation system subclasses that and monitors it for creation of document child windows. The impersonation system also changes the address that Windows would have used to send messages to the application to a substituted address provided by the impersonation system at step 309. Finally, the impersonation system creates a window referred to as the "key window" at step 310. The key window serves a file association function that will be explained below.

Figure 4:
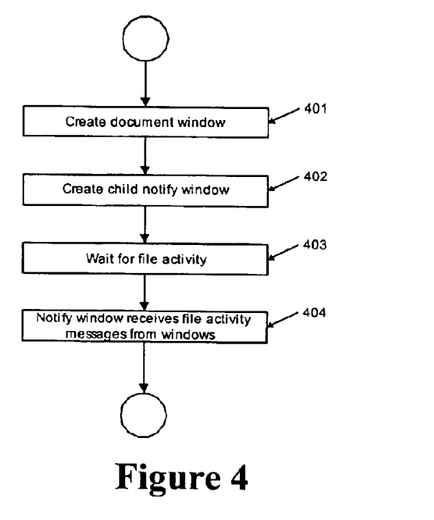
FIG. 4 depicts a flow chart of the actions performed by the impersonation system when a document window is created.

Whenever a document window is created by the application, the impersonation system creates a child window of that document window that receives messages from the operating system and other impersonation system functions. This is depicted in steps 401 and 402 of FIG. 4. This child window is referred to as the notify window. The notify window receives messages from the operating system at step 404 whenever its parent document window is activated by the program or user action. These activation messages are used by the impersonation system to keep track of the currently active document, so as to associate file activity with the correct document window. When a child document window is created in an MDI application, the impersonation system creates a notify window that is a child of that child document window.

Figure 5:
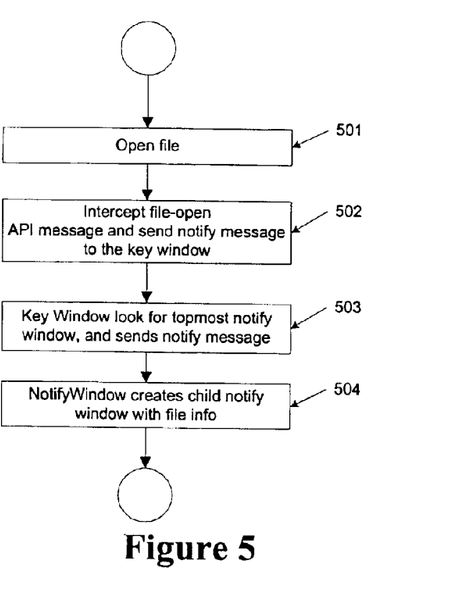
FIG. 5 depicts a flow chart of the actions performed by the impersonation system when a file is opened or closed.

Referring now to FIG. 5, when a new file is opened by the application at step 501, the file can be opened, its contents read into memory, and the file closed before any visible reference to the new file appears on screen. The impersonation process can intercept at step 502 an operating system message that a file is being opened and closed, and send a message to the key window indicating file activity. Because the key window does not get any processing time from the operating system until after the file open/close activity is complete, the key window receives this open notification after the document has been displayed and the file has been closed. The key window then looks for a topmost notify window associated with the active document window at step 503 and creates at step 504 a child notify window to store information about the file that was just opened, such as its name, path and attributes. This child notify window is also not visible. The child notify window contains all the information necessary to act upon the file when the document on screen is closed. This enables the impersonation system to distinguish between a true file close and the sequence of operations performed when a file is saved, which involves closing, updating, and reopening while the document window remains unchanged. This is different from a true file close, in which the document window is also closed along with the actual file and all temporary files associated with the document window.

In addition, the impersonation system can perform an action on a file as it is being opened, based on rules established by the program indicating how to handle files of that type. For example, the program could decrypt a file that has been encrypted.

Figure 6:
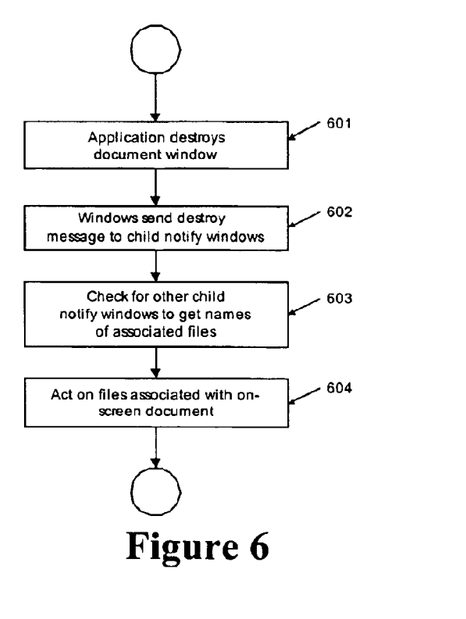
FIG. 6 depicts a flow chart of the actions performed by the impersonation system when a document window is destroyed.

When the application destroys the document window visible on screen, depicted at step 601 of FIG. 6, the operating system sends at step 602 a WM_DESTROY message to the child windows before the document is removed from the screen. The impersonation system notify window is a child of this document window. It responds to this message by checking at step 603 for the existence of all other child notify windows in order to obtain the names of files that were opened in association with this document. For example, opening a file called "test.doc" would have caused a child notify window to be created by the impersonation system for that file name; however, associated files such as temporary files, backup files, AutoSave files, and linked documents including templates, could also have been opened and closed while the document was on screen. Each of these items can be associated with a child notify window. Thus, when the document window is destroyed, the notify window contains child notify windows with the names and attributes of each of these files. Following rules established by the program indicating how to handle files of the type, the impersonation system can perform an action at step 604 on each file. For example, the user could be prompted to encrypt the file, or the file could be automatically encrypted. For the case of encryption, the file locking system acts upon the files listed in the child notify windows and associated with the document window prior to returning from the WM_DESTROY message. Thus, when the document is removed from the screen, all files associated with that document have been encrypted or appropriately handled (e.g., encrypted, shredded, etc.) by the impersonation system.

Encryption and File Formats

The basic premise of the impersonation system as applied to the file locking system program is that when a file is opened, its contents are checked to see if it is encrypted, and if so, assuming the user has been authenticated, it is decrypted before allowing the application program access to the contents. When the file is closed, the contents are encrypted.

The file locking system uses publicly available encryption methods to encrypt its data; however, it is an element of the process that the data is further protected from corruption by the methodology used to save the data in its physical format on disk.

Figure 7:
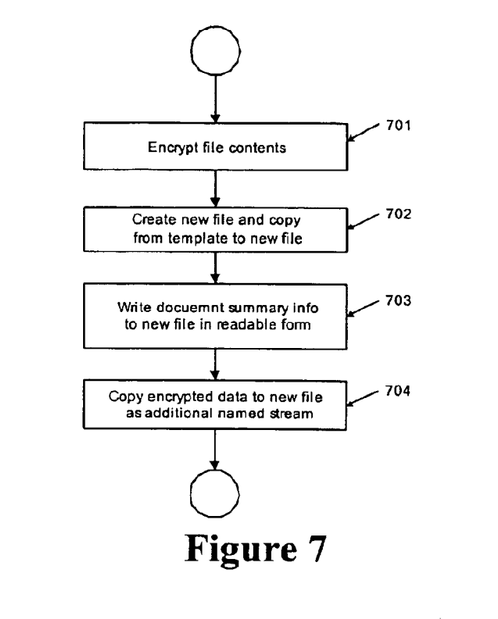
FIG. 7 depicts a flow chart of the steps performed when the file locking system encrypts a document.

Microsoft Office products use the OLE Docfile format to save file information. The Docfile format consists of header information, and one or more named streams representing elements of the document and additional information such as document summary information. When the file locking system encrypts a Docfile, the entire contents are encrypted, as depicted at step 701 of FIG. 7. A template of the same format, e.g. a Word document, is copied to a new file at step 702. The template contains visual information representing that the file is encrypted. The document summary information from the encrypted file is copied in readable form over the information contained in the new file at step 703. The encrypted data is then added at step 704 as an additional named stream in the file. There are two results with this method. (1) When the file is opened by an application that does not have the file locking system running, it only opens the named streams that are referenced in the document information contained in the main stream. This substitute stream contains no references to the actual encrypted data. The substitute stream is also coded with application specific data that makes the document read-only or password protected, preventing the user from saving the file and potentially corrupting or changing the contained encrypted data. (2) The summary information for the original document is still contained in the encrypted document in readable form. This allows applications to search for documents based on author or keywords, even though the document is encrypted.

When the file locking system opens a Docfile, it looks for the named data stream with the encrypted data, and decrypts it. The decrypted data is renamed to the original filename, and the containing encrypted document is destroyed and wiped from the disk (see disk wiping).

Documents that don't use the OLE Docfile format such as text files contain a header with text warning the user not to edit the document or the encrypted data may become unusable. It is a backup feature of the file locking system that the header includes indicators that allow for the searching of the start of the encrypted data, and that indicate the length of the encrypted data. So, even if a user inadvertently adds data to the start or end of the document, the original data is still recoverable.

Temp Files and Disk Wiping

Most operating systems delete a file by deleting the first character of its name from its file allocation table. It is a feature of several disk utilities to recover deleted files by restoring this first character. The references in the table to the location on the disk of the original data remain until reused by the system. Most Windows applications make heavy use of temp files in editing, changing and saving a file. These temporary files often contain clear text of confidential information that the user is totally unaware of. Also, the encryption process itself must use a clear text version of the file as source for encryption. Many times it is possible using disk utilities or other forensic software technology to find significant portions of clear text of files that were encrypted or deleted. Even though the user believes his file to be encrypted or deleted, recoverable clear text fragments of this file still exist on the disk. It is an element of the file locking process that because it knows of all temp files that were associated with a document (because of the notify windows described above), and when the document is closed and deleted (because of the child notify windows created by the key window), the file locking system can take action to protect this information. The government's NISPOM standards specify a method for destroying classified data on a disk. The file locking system uses this method on all temporary files that are created and deleted by the application. In addition, to further frustrate recovery, the file locking system renames the temporary file to a single letter name before deleting it from the file allocation table. Thus when the temporary file is deleted, there are no other characters in the file allocation table to indicate the file name or purpose.

Not only are the temporary files created by the application wiped in this manner, but the user is also given the option of deleting other existing files using this feature.

Special Purpose Header Information

The format of encrypted data stored on disk is integral to the system. Encrypted information and flags in the header are necessary to decrypt the document successfully. The flags contained in this header also indicate the type of encryption used. For example, files can be encrypted with the user's master key, with a passphrase, with a shared group key, or with one of many public key encryption formats.

The header also can contain information with special handling procedures associated with it. For example, the file locking system can contain code signifying it should immediately delete a file after it is closed. Timestamp related functions are possible, so that files can only be decrypted within a specified number of days. Other flags can indicate that the file locking system program should not allow the system to copy to the clipboard, copy the file to another name, send the file using a mail program, or print the file.

These special purpose flags are possible because the file locking system has sub-classed the appropriate window procedure, and can intercept associated operating system messages to take these actions.

Block Format of Sensitive Information

It is the nature of cryptographic functions, that sensitive data must be passed from one function to another to accomplish encryption or decryption. For example, the file locking system uses a user interface to authenticate the user via logon information. This logon information is then used to decrypt the master key. The master key is then used by the file locking system to encrypt or decrypt each of the files opened and closed in each protected application. The clear text data of the masterkey is highly sensitive information. If it were intercepted by an attacker using a "data sniffing" program embodied in a Trojan, worm, or virus, then the file locking system security would be completely compromised.

Rather than pass such sensitive information as the clear text of the decrypted masterkey to one of the file locking system's functions, the file locking system instead passes a pointer to a shared block of memory that contains this information. In a preferred embodiment, the block is at least 1024 bytes long, and contains other random data visually indistinguishable from the sensitive data. The sensitive data is located at a constantly changing offset in the block known only to the programs. It is an element of the file locking process that the sensitive data is stored at a different offset in the block each time the file locking system is run.

Operating systems routinely 'page' memory to temporary disk files. It is a common mistake of many cryptographic systems to ignore this system behavior. The file locking system further protects system security because of the temp file wiping mentioned above. Even if sensitive data were 'paged' to a disk file, this data is wiped from the disk drive when the file locking system handles the deletion of temporary files.

The program impersonation system of the invention can also be used to add to existing applications many more capabilities besides encryption/decryption. These added capabilities include:
1. Compression.
2. Language Translation, e.g., English to French, French to English, etc.
3. Format Translation, e.g., Microsoft Word format to WordPerfect format.
4. Virus Checking.
5. Document Security—e.g., adding a password.
6. Automatic Backup—Duplicate of document stored at another location.
7. Version Control: each save of the document can cause a copy of the current file to be stored with a different name or in a different stream.
8. Remote Storage: a reference to the document is stored locally, but the document contents are stored at a remote location.
9. Spell checking and/or grammar checking a document.
10. Changing the actual text of a document.
This list is for illustrative purposes. Any other added functionality that utilizes the impersonation method of the invention is also within the scope of the invention. The invention is defined by the appended claims.

What is claimed is:

1. A method for associating file activity of an application with the graphical display of the file on a screen comprising the steps of:
   loading by an operating system an executable code of a message monitoring program adapted to monitoring a message sent by an operating system to a document display window;
   establishing by the message monitoring program a system-wide window hook using available operating system API functions, said system-wide window hook associated with one or more functions in a library of said message monitoring program;
   loading the message monitoring program library into the memory space of an application program, said application having been newly started and having an import table and a newly created window;
   fixing the import table of the application with addresses of functions from the message monitoring program library; and
   substituting the application's main window function with a message monitoring program window function;
   Wherein said method further comprising, upon receipt of a document window destroy message by a document's notify window, checking for the existence of a child notify window associated with a file that was opened in association with said document, and acting upon said associated file before destroying said document window,
   wherein an action includes deleting a temporary file from a mass storage device, wherein the deletion includes the steps of wiping the device sectors of the data contained therein, and renaming the temporary file to a name consisting of one letter prior to deletion.

2. The method of claim 1, further comprising creating a key window when an application is started, said key window adapted to receive a message when a file is opened and closed.

3. The method of claim 2, further comprising:
   sending a message to the key window when a file is opened;
   creating a child notify window associated with said file; and
   creating a notify window as a child window of a document window associated with said file.

4. The method of claim 1, further comprising:
   creating a notify window when a document window is created, wherein the notify window is a child window of the document window; and
   receiving by the notify window a message from the operating system when the parent document window is activated by either the application program or by action of a user.

5. The method of claim 1, comprising a user of an application specifying one or more rules to the application, each said rule indicating an action to be taken on said associated file before destroying said document window.

6. The method of claim 5, wherein an action includes encrypting said associated file, wherein encrypting comprises:
   creating a new file containing a template of the same format as said associated file, said new file including a header, wherein said header is not encrypted;
   copying to the new file a document summary in readable form;
   copying to the new file visual indicia representing that the file is encrypted;
   copying encrypted data from the associated file to the new file as a named stream, said encrypted data having a beginning and a length; and
   writing a code to a substitute stream to prevent the new file from being written over by a user.

7. The method of claim 6, further comprising the step of including in the header a flag indicative of the type of encryption used on the associated file.

8. The method of claim 6, further comprising the step of including in the header a flag indicative of a handling procedure to be performed on said encrypted file.

9. The method of claim 6, further comprising the step of loading data from the encrypted file into a memory block containing other random data, said memory block having a beginning, wherein an offset from the beginning of the memory block of the data from the encrypted file changes each time the message monitoring program executable code is loaded.

10. The method of claim 6, further comprising the step of including in the header a flag indicative of the length of the encrypted data, and a flag that allows the message monitoring program to search for the beginning of the encrypted data.

11. The method of claim 5, wherein an action includes compressing said associated file.

12. The method of claim 5, wherein an action includes translating said associated file into another language.

13. The method of claim 5, wherein an action includes converting said associated file into another file format.

14. The method of claim 5, wherein an action includes searching for a virus in said associated file.

15. The method of claim 5, wherein an action includes altering text in said associated file.

16. The method of claim 5, wherein an action includes changing or adding an optional setting to said associated file.

17. The method of claim 5, wherein an action includes spell checking said associated file.

18. The method of claim 5, wherein an action includes creating a backup of said associated file.

19. The method of claim 5, wherein an action includes versioning said associated file under a different name or stream each time said associated file is saved.

20. The method of claim 5, wherein an action includes storing said associated file content in a remote location, and storing a reference of said associated file locally.

21. The method of claim 5, wherein an action includes grammar checking said associated file.

22. The method of claim 1, further comprising monitoring by the message monitoring program window function the creation of a document child window.

23. A method for associating file activity of an application with the graphical display of the file on a screen comprising the steps of:
    loading by an operating system an executable code of a message monitoring program adapted to monitoring a message sent by an operating system to a document display window;
    establishing by the messaae monitoring program a system-wide window hook using available operating system API functions, said system-wide window hook associated with one or more functions in a library of said message monitoring program;
    loading the message monitoring program library into the memory space of an application program, said application having been newly started and having an import table and a newly created window;
    fixing the import table of the application with addresses of functions from the message monitoring program library; and
    substituting the application's main window function with a message monitoring program window function;
    wherein said method further comprising, upon receipt of a document window destroy message by a document's notify window, checking for the existence of a child notify window associated with a file that was opened in association with said document, and acting upon said associated file before destroying said document window,
    wherein an action includes deleting a temporary file from a mass storage device, wherein the deletion includes the steps of wiping the device sectors of the data contained therein, and renaming the temporary file to a name consisting of one letter prior to deletion,
    wherein the wiping is performed in conformance with the standards set for in the United States National Industrial Security Program Operating Manual.

24. The method of claim 23, further comprising creating a key window when an application is started, said key window adapted to receive a message when a file is opened and closed.

25. The method of claim 24, further comprising:
    sending a message to the key window when a file is opened;
    creating a child notify window associated with said file; and
    creating a notify window as a child window of a document window associated with said file.

26. The method of claim 23, further comprising:
    creating a notify window when a document window is created, wherein the notify window is a child window of the document window; and
    receiving by the notify window a message from the operating system when the parent document window is activated by either the application program or by action of a user.

27. The method of claim 23, comprising a user of an application specifying one or more rules to the application, each said rule indicating an action to be taken on said associated file before destroying said document window.

28. The method of claim 27, wherein an action includes encrypting said associated file, wherein encrypting comprises:
    creating a new file containing a template of the same format as said associated file, said new file including a header, wherein said header is not encrypted;
    copying to the new file a document summary in readable form;
    copying to the new file visual indicia representing that the file is encrypted;
    copying encrypted data from the associated file to the new file as a named stream, said encrypted data having a beginning and a length; and
    writing a code to a substitute stream to prevent the new file from being written over by a user.

29. The method of claim 28, further comprising the step of including in the header a flag indicative of the type of encryption used on the associated file.

30. The method of claim 28, further comprising the step of including in the header a flag indicative of a handling procedure to be performed on said encrypted file.

31. The method of claim 28, further comprising the step of loading data from the encrypted file into a memory block containing other random data, said memory block having a beginning, wherein an offset from the beginning of the memory block of the data from the encrypted file changes each time the message monitoring program executable code is loaded.

32. The method of claim 28, further comprising the step of including in the header a flag indicative of the length of the encrypted data, and a flag that allows the message monitoring program to search for the beginning of the encrypted data.

33. The method of claim 27, wherein an action includes compressing said associated file.

* * * * *